United States Patent Office 3,231,314
Patented Jan. 25, 1966

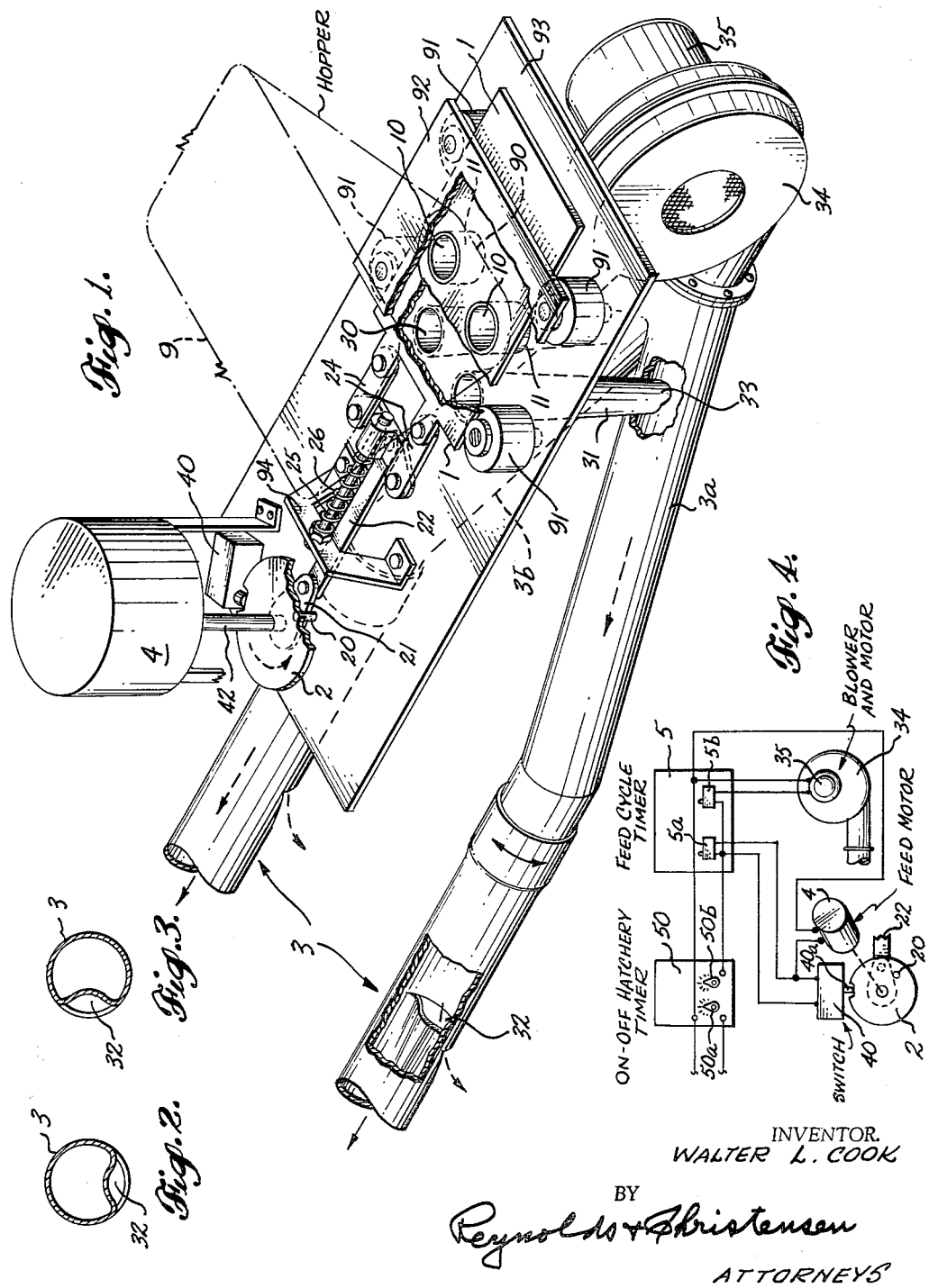

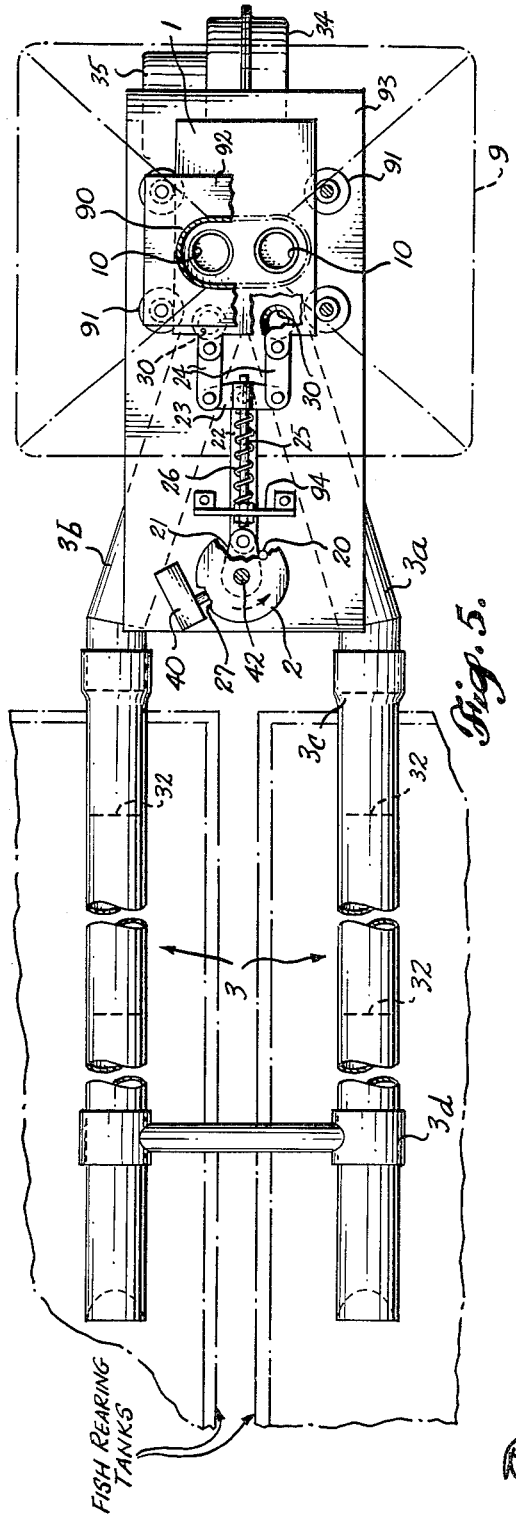
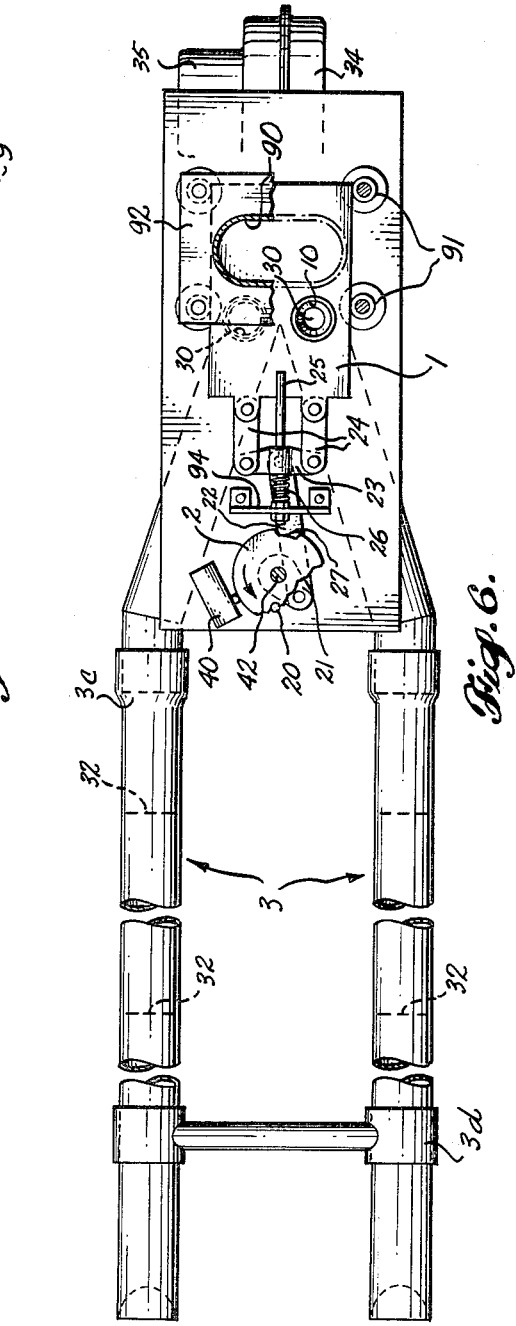

3,231,314
AUTOMATIC FISH FEEDER
Walter L. Cook, Renton, Wash., assignor to Heath-Tecna Plastics, Inc., Auburn, Wash., a corporation of Washington
Filed Nov. 18, 1963, Ser. No. 324,415
7 Claims. (Cl. 302—49)

This invention relates to improvements in apparatus for feeding finely granulated or pelletized feed to fish or other livestock, and more particularly concerns an improved means for dispensing and scattering metered quantities of feed in controlled manner into fish rearing ponds or tanks such as are employed in typical fish hatcheries. The invention is herein illustratively described by reference to the presently preferred embodiment thereof; however it will be seen that certain changes and variations therein may be employed without departing from the essential features involved.

In the typical hatchery trout and other fish are usually raised in long tanks or troughs. To conserve ground space or floor space in interior installations these tanks are usually placed side by side in pairs with the pairs spaced apart to provide walkways between pairs. Because of the large numbers of fish confined in these tanks feeding has presented a problem. Scattering of the feed by hand or by machine is necessary so that all fish will have adequate opportunity to receive sufficient nourishment. Control and efficiency in the manner of dispensing the feed is essential to economy in the hatchery operations. Loss of feed by spillage, windage (in outside installations) and by overfeeding some fish (the more aggressive ones) in order to insure adequate feeding of others must be avoided.

The measurement and distribution of fish food, therefore, becomes a rather exacting chore for hatchery attendants, and it is a primary object of this invention to provide a fish feeder which will automatically supply metered quantities of fish food at regular intervals and well distributed, dependably under the conditions found at such hatcheries, and which by suitable change in the metering means can supply at each feeding the quantity suited to the number and size of fish in the trough or troughs.

With reference to the conditions found at the hatcheries, it will be understood that because the feeding mechanism is placed adjacent to the tanks either in a humid room or exposed to the weather, moisture is a problem, hence the feeder must be such as will overcome the problem of clogging due to caking of the dried feed materials which are usually quite hygroscopic. Moreover, the feeder should be capable of handling the various dry feeds used, which may range from powder-like crumbles for very small fry to large pellets up to 5/32 inch in thickness for large fish. A further object, therefore, is to devise a feeder which overcomes the moisture problem, which meters and broadcasts the finely granulated as well as the heavy pelletized types of feed materials in desired manner, and which is capable of consistently reliable automatic operation controlled by a timer so as to free the attendant for other duties in the hatchery.

In accordance with this invention, a metering type feeder is provided efficiently utilizing air currents to convey and broadcast the feed materials and, conjunctively therewith, to provide a drying action preventing moisture condensation in and upon surfaces contacted by the dry feed materials and in the materials directly, thereby to achieve consistently reliable and clog-free operation of all passages and mechanical parts in the feeder. To these ends, air currents created within the apparatus are produced not only in the discharge duct from which the feed is blown but in the internal passages of the metering mechanism by which quantities of feed are delivered into the discharge duct. Further, these air currents are initiated in advance of delivery of dry feed into the discharge tube and continue after delivery of the food, so as to insure advance drying of all passages through which the food is to move, and to insure cleaning of all residual food particles from those passages after each feeding cycle; otherwise there may be a tendency for bonding of these residual particles to wall surfaces by the effects of moisture in the periods between cycles.

Again, when long ducts are provided for distributing food thus throughout the length of a tank, it is a feature of the machine to provide a plurality of broadcast openings distributed along each duct, so arranged as to discharge part only of the air-borne food particles at each such exit opening, and so to effect generally uniform distribution of the food along the length of the tank.

A further object hereof is to augment the action of air currents in maintaining the passages and parts clear by a simple means associated with the feed mechanism which will abruptly jar the structure so as to break up any collections of feed materials, especially to prevent the same from hanging up in the hopper. This action is particularly desirable in the event of a clogging tendency preventing reliably complete filling of the metering containers and thereby resulting in underfeeding.

A further feature resides in such a feeder having an adjustable discharge duct or duct orifices which may be rotated or tilted about a longitudinal axis so as to counteract cross winds that might tend to concentrate delivery of the feed at one side only of the trough, or to blow it too far to land within the trough, or otherwise to disturb the desired lateral distribution of the food at each exit.

Still another feature of the feeder is the provision of replaceable metering elements conveniently changing the capacities thereof from time to time without otherwise disturbing or altering the feeder as a whole.

With these and other features, objects and advantages of the invention in mind, and others that will appear more fully hereinafter, the present invention comprises the novel combination of elements shown in a preferred form in the accompanying drawings, and as will be described in this specification and claimed in the claims.

FIGURE 1 is an isometric view of the improved feeder, with its storage hopper shown by broken lines and with various other parts broken away for convenience in illustration.

FIGURE 2 is a cross-section through a delivery duct, showing an intercepting exit opening, disposed in what might be called a normal position, for direct downward exit of food, and FIGURE 3 is a like view, with the intercepting means disposed for lateral exit of food.

FIGURE 4 is a simplified electrical diagram of the control means for the feeder.

FIGURE 5 is a plan view of the feeder, with the shuttle of its metering device halted in position to receive food from the supply hopper, prior to transit towards its dispensing position, and FIGURE 6 is a similar view showing the shuttle in dispensing position.

In general the automatic fish feeder herein described includes a hopper wherein is stored a large quantity of food—say at least enough for one day—a metering means including a shuttle incorporating a metering container of predetermined capacity guided for movement between a receiving position, in registry with the hopper's discharge opening and a dispensing position, wherein it registers with a delivery chute, for delivery to the discharge duct, a means to move the shuttle positively from the receiving position to the dispensing position, and then to return it with jarring abruptness back to the receiving position, a blower directed into the discharge duct, the discharge from which preferably precedes and continues after discharge of food, an ejector type orifice at the juncture of the discharge duct with the delivery chute to draw air into the duct through the metering passages, and timing means to effect cycling of the mechanism at required intervals. The illustrated feeder has two discharge ducts and associated metering containers in its shuttle mechanism, so as to feed into two parallel troughs, although it will be understood that it may supply one only, or may be arranged to supply more than two.

As shown, storage hopper 9 is arranged to deliver eventually into two parallel discharge ducts 3, which latter would extend lengthwise of two fish tanks (FIGURE 5). If desired, the hopper can be compartmented so as to permit different feed materials to be supplied to the respective ducts. A horizontally disposed metering shuttle plate 1 is guided for reciprocation in a longitudinal plane immediately beneath the hopper's discharge opening 90, which registers with an opening (not shown) of like size and shape in a plate 92. At a given spacing beneath shuttle plate 1 is a fixed base plate 93 also disposed in a horizontal plane. Mounted for turning on upright axes on base plate 93 are two pairs of rollers 91 which support and guide the shuttle plate 1 for reciprocation between a receiving position, such as that in FIGURES 1 and 5, and a dispensing position, approximately the position in which it is shown in FIGURE 6. The shuttle or gate 1 has apertures 10, one for each duct 3 that it supplies, which in the offset or dispensing position register with the delivery aperture 30 in plate 93 leading—preferably by way of a chute 31—to its duct 3. Sleeves 11 (FIGURE 1) are removably secured in the shuttle apertures 10, and slidably retained between plates 92 and 93. These sleeves serve as metering containers. Being removably secured in the shuttle plate, sleeves 11 of different internal diameters, hence of differing charge capacities, can be interchanged as required. Their removal and replacement is readily accomplished by disengaging links 24, referred to hereinafter, from the shuttle plate 1 and sliding the plate clear of fixed plates 92 and 93.

Movement of the gate 1 and its sleeves 11 between receiving and dispensing positions is effected by mechanism that includes a rotatively driven crank disk 2—preferably formed with a peripheral cam—which carries a crank pin 20 in position to engage a crank lever 21. The latter is free to turn on the disk's drive shaft 42 and can therefore rotate, during part of a cycle, faster than the disk, for a purpose to appear. This lever is connected by a link 22 to the shuttle 1 through the yoke or crosshead 23 and links 24. A rod 25 guides the yoke 23 for movement towards and from a fixed abutment 94. A compression spring 26 surrounding rod 25, intermediate yoke 23 and abutment 94, urges the shuttle away from abutment 94 and towards its receiving position beneath the hopper.

The disk 2 is fast to a motor shaft 42, driven by a motor 4 at a constant rate whenever the motor is energized. The motor is energized through a switch 40. The peripheral cam surface of disk 2 is for the most part circular, but has a notch 27 that allows the switch actuator 40a to extend and open the switch when the cam disk reaches a given position of rotation.

At the start of a cycle, begun by closing feed cycle timer switch 5a to energize motor 4, the disk 2 begins to rotate, and almost immediately its notch 27 moves beyond actuator 40a, thereby to close switch 40 and to continue energization of motor 4 despite automatically timed reopening of switch 5a. Rotation of disk 2, and with it, of pin 20, continues. At the start the gate 1 was in its receiving position, and while engagement of pin 20 with the lever arm 21 starts movement of the gate towards delivery position, it does not immediately come into registry in any degree with delivery opening 30, but only after some period of time. Meanwhile closure of switch 40, or of switch 5b simultaneously with closure of switch 5a, has energized motor 35 and initiated operation of blower 34. Air moves through the ducts before discharge of food begins, and continues during such discharge. This dries the ducts during the pre-feed period. By the time the lever arm 21 reaches its dead-center position, opposite its FIGURE 5 position, the metering sleeve 11 will increasingly come into full registry with chute 31, and all food from each such sleeve should have dropped through its delivery opening 30 into its chute 31 and thence into its branch duct 3a or 3b, leading to its main duct 3, and should have been picked up by the continuing air current from blower 34, and distributed through the outlets from duct 3.

Shortly after lever arm 21 passes its dead-center position the spring 26, which has been compressed during the initial half-cycle, snaps the gate 1 back to its receiving position, but since the disk 2 must continue its rotation at a constant rate for nearly a half-cycle before the switch 40 reopens, and the motors 4 and 35 are deenergized, the blower 34 continues to operate, and tends to clear and to dry the ducts. The air also moves through the metering mechanism, with like results. Eventually the actuator 40 drops into the notch 27, and the motors are deenergized, separately or simultaneously.

The forceful return of gate 1 to its initial receiving position, and its abrupt stoppage, jars the shuttle, the hopper, and the ducts, and tends to dislodge any feed that has lodged in or stuck to the mechanism or ducts, and to drop it into the continuing air current from the blower.

In due time—at the end of one revolution of disk 2—the pin 20 catches up with the lever arm 21, and the actuator drops into notch 27 at this time, deenergizing the motors and terminating a cycle.

The timing of the blower 34 to afford pre-feed and post-feed drying air may be effected otherwise than by the arrangement just described, although that is the preferred and simplest arrangement. It is the inherent result of the definite rate of rotation of the crank disk 2 by feed motor 4, and of the spacing between the gate's receiving and delivering positions.

The advantage of starting air discharge into the ducts prior to delivery of food into the ducts is two-fold. It tends to dry the ducts, and all passages leading into them, so that food will not tend to stick, and it assures a relatively rapidly moving vehicle for the food as it is discharged into the ducts. The advantage of continuing air discharge after termination of delivery of food is, again, drying, and also the clearing of food particles, even such as may be dislodged by the jarring stoppage of the gate 1, from the ducts and passages.

The feed cycle timer 5 is normally operated to repeat the feed cycles over and over again for as long as electrical energy is available to it. Thus at each feeding the shuttle mechanism will usually be reciprocated through several cycles.

An on-off hatchery timer 50 in series with the feed cycle timer 5 establishes the timing and duration of the feeding periods. A control knob 50a permits adjusting the feed period duration and a control knob 50b permits adjusting the time between feed periods. Any of various known devices may be used to perform these functions.

When the gate delivers its charge through the delivery aperture 30, it will by preference pass by gravity through the chute 31 and thence into a branch duct 3a or 3b that leads to the main duct 3. The blower 34 delivers air through the ducts 3a, 3b and 3, and out at exit openings distributed at intervals along the ducts 3. The lower ends of chutes 31 are directed downwardly and at their upstream sides are projected as a suction-inducing baffle 33 into the current of air from the blower. This induces suction through the chute and through the gate and its sleeves 11, and through clearances leading to the latter, to insure the flow of air through the metering mechanism, as described above, to dry all surfaces and the food particles and to draw loose food particles into the chutes. The air current through the ducts, as already stated serves as a vehicle for the food. If moisture is a particularly serious problem, the air current can be warmed.

Each duct has at least one exit opening 32, or preferably several exit openings at intervals in its length. Each opening is formed by slitting the duct wall in the circumferential direction and bending the downstream edge of the slit inwardly of the duct to form a lip or scoop which intercepts a part of the air current and its entrained dry food, and directs the same outwardly towards the fish tank it serves. At its end distant from the gate the duct is open, to insure discharge of all food not discharged through side openings 32.

If desired the ducts 3 may be rotated on their longitudinal axes to any desired position in order to determine the direction of their discharge openings 32. Thus the food may be blown axially and then directly downward, or axially and then laterally to any adjustable degree. As shown ducts 3 are joined to the respective branch ducts 3a and 3b, by loose spigot joints 3c, and are supported at their distal ends rotatably within the interconnected sleeves 3d. Duct rotative positioning is desirable in certain installations in order to compensate for cross-wind or if for any other reason it is desired to adjust the placement of feed discharged through the side openings 32.

The device has been designed as an automatic fish feeder and has been described primarily as such, operating reliably under conditions present in such usage. It will, of course, be evident that it can be used to advantage to dispense other feeds or dry materials, for various purposes, whenever cyclical or controlled discharge thereof is required and especially when problems are presented similar to those overcome by the present invention. These and other aspects of this invention will be evident to those skilled in the art from the foregoing disclosure of the presently preferred embodiment thereof.

I claim as my invention:

1. In combination with a supply hopper for dry fish feed and like comminuted materials, having a bottom outlet, dispensing mechanism including a stationary closure member horizontally disposed beneath and spaced below the hopper's outlet, and formed with an aperture offset laterally from the hopper's outlet, and a metering closure member shiftable between a receiving poistion in registry with the hopper's outlet, to receive a metered quantity of material, and a dispensing position in registry with the aperture in the stationary closure member; the combination further including a blower, a duct extending continuously from the blower to a distant outlet, a hollow chute positioned to receive material through the aperture in the stationary closure member, and entering said duct for delivery thereinto intermediate said blower and its distant outlet, and means to induce suction, as a result of movement of air through the duct, within said chute and through said dispensing mechanism, to clear any residue of materials from the dispensing mechanism after delivery of material through the aperture.

2. The combination of claim 1, including spring means to return the metering closure member to and to stop it abruptly at its receiving position, following delivery of material, and prior to termination of air movement from the blower through the duct.

3. In combination with a supply hopper for dry fish feed and like comminuted materials, having a bottom outlet, dispensing mechanism including a metering closure member shiftable laterally between a receiving position in registry with the hopper's outlet, and a dispensing position laterally offset from its receiving position, duct means positioned to receive and convey materials dispensed from said metering closure member, a blower discharging through said duct means to convey materials so dispensed, means to effect shifting of the metering closure member from its receiving to its dispensing position, and spring means to return the metering closure member to and to stop it abruptly at its receiving position, following delivery of material.

4. Apparatus for dispensing metered quantities of dry fish feed and like comminuted materials, comprising a blower, a discharge duct arranged to receive air from the blower and to convey it to a distant outlet, for discharge, and having a material-receiving opening located in its wall between said outlet and said blower, a supply hopper having an outlet for such materials, and dispensing mechanism for delivering metered charges of materials from said hopper through its outlet during blower operation, for discharge through the duct, said dispensing mechanism including a stationary member spaced below the hopper's outlet and having an aperture registering with the opening in the duct but offset laterally from the hopper's outlet, a metering element shiftable transversely between a receiving position, in registry with the hopper's outlet, and a dispensing position, in registry with the opening in the duct, motorized mechanism to advance the metering element from its receiving to its dispensing position, said motorized mechanism including a cyclically operable powered driving member and a driven member engageable by the driving member during a first portion of the latter's cycle, to effect such advance, and disengageable therefrom thereafter, and spring means operable upon such disengagement to effect spring-returned movement of said metering element to, and its abrupt stoppage at, its receiving position, thereby to jar the dispensing mechanism and associated hopper.

5. Dispensing apparatus as in claim 4, including timer means arranged to initiate delivery of air from the blower through the duct before the driving member is energized for advance, and to continue such delivery both during and for a period after spring-returned movement of the metering element.

6. In combination with a supply hopper having a discharge opening, a stationary member spaced from said opening and having an outlet opening offset from said opening, a metering element movable between a receiving position in registry with the discharge opening, and a delivery position in registry with the outlet opening, a rotative lever, a member concentric with the lever and driven at a constant rate, an element carried by said member and positioned to engage and rotate the lever, an operative connection between the lever and the metering element for moving the latter from its receiving position to its delivery position by rotation of the lever by means of the member and its element through 180° to a center position, force-producing means acting on the metering element and the lever, for returning the metering element quickly from its delivery position to its receiving position, and abruptly stopping it there, thereby moving the lever ahead of its rotating element, and jarring the hopper and its associated parts, and drive means for the member including switch means operable to complete a single rotation of said member, to reengage its element with the lever, and then to halt rotation of the member, and timer means to initiate rotation of the member.

7. A dispenser for dry fish feed and like comminuted materials, comprising a supply hopper having a discharge opening, means defining a delivery aperture offset laterally from said discharge opening, a charge-metering element guided for movement between a receiving position, in registry with said discharge opening, and a delivery position, in registry with said delivery aperture, actuation means so to move said element, a duct to which material is delivered from said delivery aperture, having a distant discharge opening and means to deliver an air current through said duct during delivery of materials thereinto, said charge-metering element being formed as an apertured plate, and a sleeve registering with said aperture and removably supported by the plate, whereby alternative sleeves of different capacity may be used as part of said charge-metering element.

References Cited by the Examiner

UNITED STATES PATENTS

| | | | |
|---|---|---|---|
| 1,148,785 | 8/1915 | Leggett | 302—36 |
| 1,210,130 | 12/1916 | Worsham | 302—57 |
| 1,450,903 | 4/1923 | Newhouse | 302—42 |
| 1,786,969 | 12/1930 | Van Der Heuel | 302—28 |
| 1,831,491 | 11/1931 | Hansen | 302—49 |
| 1,901,203 | 3/1933 | Thompson | 302—49 |
| 2,200,713 | 5/1940 | Ericson | 302—49 |
| 2,254,269 | 9/1941 | Clark | 222—361 |
| 2,688,517 | 9/1954 | Riordan | 302—28 |
| 2,827,333 | 3/1958 | Wallin | 302—42 |
| 3,115,369 | 12/1963 | Bozich | 302—28 |

SAMUEL F. COLEMAN, *Primary Examiner.*

ANDRES H. NIELSEN, *Examiner.*